Oct. 20, 1970  F. R. ARCHIBALD  3,535,105
RECOVERY OF FERRONICKEL FROM OXIDIZED ORES
Filed July 14, 1969  5 Sheets-Sheet 1

INVENTOR.
FREDERICK R. ARCHIBALD
BY
ATTORNEYS

INVENTOR.
FREDERICK R. ARCHIBALD
BY Maybee & Legris
ATTORNEYS

Oct. 20, 1970 — F. R. ARCHIBALD — 3,535,105
RECOVERY OF FERRONICKEL FROM OXIDIZED ORES
Filed July 14, 1969 — 5 Sheets-Sheet 5

INVENTOR.
FREDERICK R. ARCHIBALD
BY Maybee & Legris
ATTORNEYS

United States Patent Office 3,535,105
Patented Oct. 20, 1970

3,535,105
RECOVERY OF FERRONICKEL FROM
OXIDIZED ORES
Frederick R. Archibald, Toronto, Ontario, Canada, assignor to Falconbridge Nickel Mines, Limited, Toronto, Ontario, Canada, a company
Continuation-in-part of application Ser. No. 747,144, July 24, 1968. This application July 14, 1969, Ser. No. 841,301
Int. Cl. C22b 1/12, 5/12; C22c 23/02
U.S. Cl. 75—21                                                18 Claims

ABSTRACT OF THE DISCLOSURE

A process for recovering high purity ferronickel or by an alternative modification, ferronickel matte from oxidized nickel ores in which fine-sized high-iron constituents and coarse-sized low-iron constituents in the ores are separated, the low-iron material is comminuted, the moisture content of the high-iron material is adjusted and micropellets are formed therefrom. The comminuted low-iron material and micropellet-containing high-iron material are blended and briquettes are formed from the blend. The briquettes are treated with hot reducing gases, which may contain controlled concentrations of sulphur, in a shaft furnace to reduce metal from the group iron and nickel in an amount equivalent to at least about twice the amount of contained nickel while leaving substantially unreduced relatively more stable oxides of metals such as chromium and silicon, to reduce the remainder of the iron to ferrous oxide and to react it in the solid state with silicates. The reduced briquettes are melted to form a barren slag and, depending on their sulphur content, either high purity ferronickel or ferronickel matte, which is recovered.

CROSS-REFERENCE TO RELATED APPLICATIONS

The present application is a continuation-in-part of my copending application Ser. No. 747,144 filed July 24, 1968.

Copending United States application No. 741,747 entitled Beneficiation of Nickel Ores, and copending United States application No. 799,871 entitled Electric Arc Furnace Operation are also related to the present application.

BACKGROUND OF THE INVENTION

The material comprising many oxidized nickel orebodies varies in size from sub-micron particles to boulders and partially weathered joint blocks several feet across. Typically, the finest particles are limonitic in nature, occur near the surface of the deposit, and are relatively free from serpentine. The largest joint blocks, on the other hand, contain practically no limonite, occur at the bottom of the orebody, and consist almost entirely of ultrabasic rocks partially altered to serpentine. In between the upper, or limonitic, surface and the lower, or ultrabasic, bottom, is a mixture in highly variable proportions of limonite particles, enriched serpentine particles, partially altered ultrabasic boulders, and partially altered ultrabasic joint blocks. Underlying the whole is bedrock consisting of relatively unaltered ultrabasic rock. Typical analyses of the components of such a deposit are summarized in Table I.

TABLE I.—TYPICAL ANALYSIS OF COMPONENTS OF AN OXIDIZED NICKEL ORE DEPOSIT

| Description | Chemical analysis (percent by weight on dry basis) | | | | Free $H_2O$, percent |
|---|---|---|---|---|---|
| | Ni | Fe | MgO | $SiO_2$ | |
| (A) Limonite layer | 1.05 | 43.5 | 2.5 | 5.1 | 35 |
| (B) Limonite-serpentine mix | 1.65 | 19.0 | 20.2 | 33.1 | 25 |
| (C) Enriched serpentine | 2.00 | 8.2 | 30.3 | 40.8 | 10 |
| (D) Partially altered ultrabasic | 1.30 | 7.2 | 32.4 | 41.7 | 7 |
| (E) Relatively unaltered ultrabasic (bedrock) | 0.35 | 6.0 | 33.0 | 42.5 | 5 |

For purposes of the present invention, layers A and B, for example, are termed high-iron fraction, while C, D and E are termed low-iron fraction of the ore.

In addition to the free moisture noted in Table I oxidized nickel ores also contain minor amounts of other elements such as chromium and manganese and combined water amounting to up to 13%. The presence of free and combined moisture in the ultrabasic fractions of such deposits such as boulders and joint blocks renders them susceptible to violent decrepitation on rapid heating to temperatures approaching incandescence, with the concomitant production of undesirable proportions of fine dust. The violence of such decrepitation increases with the size of the ore pieces.

FIG. 1 is a schematic representation of two different sections of an ore deposit to which the present invention is applicable. By reference to Table I and FIG. 1, it can be seen that the various layers of such deposits vary widely not only in chemical composition and physical properties, but also in the relative proportions in which they occur in the orebody. Thus, in FIG. 1 while the limonitic layer A in section "X" accounts for no more than about 15% of the ore, the limonitic layer A in section "Y" amounts to about 50% of the ore. Similarly, while the ore in section "X" contains over 50% enriched serpentine C, that in section "Y" contains no more than 15% of this material. It is therefore important in the context of the present invention to note firstly that the above type of orebody when mined will yield a flow of ore having wide variations in average physical and chemical properties.

Secondly, it should be noted that the limonite layer A and the limonite-serpentine mix B, comprising the high iron fraction, are generally lateritic in nature, comprise a preponderance of sticky, finely divided, clay-like material, and are capable of retaining the relatively high free moisture contents for example 35 wt. percent, as indicated in Table I, for long periods. Layers C and D, comprising the low-iron portion of the deposit, consist of relatively dry boulders and joint blocks ranging in size from several inches to a foot or more in diameter. This material, even when crushed and wetted, does not take on the sticky clay-like properties characteristic of lateritic layers A and B.

Prior art methods of recovering ferronickel from oxidized ores include that described in the Journal of Metals, March 1960, pp. 202–205 under the title "Ferro-Nickel Smelting in New Caledonia." According to this method the ore is dried and preheated in a rotary kiln, and then fed with coke to an electric furnace for high temperature reduction. The ferronickel so formed contains 20–23% nickel, and impurities such as 2–4% silicon, 1.8–2.0% carbon and 0.25–0.35% sulphur, all of which necessitate further refining steps to put the metal in a marketable form.

Another type of electric smelting (U.S. Pat. No. 2,750,286) is practised in treatment of nickeliferous oxide ores containing 12% Fe and 30% MgO and involves melting the ore in an electric furnace, tapping the molten ore into a ladle, and mixing it with molten ferrosilicon to reduce the contained nickel and part of the iron to ferronickel. This product too, is contaminated with various impurities which require several refining steps for their removal (Journal of Metals, March 1960, p. 201).

A third method of treating oxidized nickel ore is described in U.S. Pat. No. 3,030,201. According to this method the ore is first comminuted or finely divided and then selectively reduced under conditions of temperature and atmosphere controlled to reduce all of the nickel and a portion of the iron in the ore. The reduced fines are smelted in an electric furnace to slag off the unreduced portion of the iron and to yield a crude nickel iron. The crude nickel iron is then refined by oxygen blowing for removal of iron and other impurities such as chromium, silicon, carbon and phosphorus, and requires an additional treatment for removal of sulphur.

These and other prior art methods of recovering ferronickel from oxidized nickel ores have the following disadvantages when applied to the type of ore with which the present invention is concerned:

(1) Sub-micron sized particles are treated with, and therefore entrained by, hot gases from which they must be separated to avoid serious nickel losses and atmospheric pollution.

(2) Free solid fragments of ultrabasic rock are subjected to rapid heating with consequent decrepitation and formation of further fines which also become entrained in hot gases and require recovery therefrom.

(3) Indiscriminate treatment of fine and coarse portions of the ore and lack of provision for blending of high-iron and low-iron portions of the ore necessitates over-reduction of at least some of the ore, especially in the presence of added carbonaceous reductants. This in turn results in the introduction of impurities such as Cr, Si, C and S in the ferronickel requiring additional process steps for their removal.

SUMMARY

In the process of the invention fine-sized, high-iron, clay-like constituents of the oxidized nickel ore are separated from the coarse-sized, low-iron constituents and treated by moisture adjusting means to form agglomerates of clay-like particles about ¼" in size or less referred to hereafter as micropellets. The coarse-sized, low-iron serpentine boulders and ultra-basic joint blocks are comminuted to provide fragments less than about 1" in size and generally about ¼" in size or less. The low-iron fragments are blended with the high-iron constituents and after the clay-like micropellets and low-iron fragments have been intimately intermixed the resulting intermediate-iron feed is briquetted to yield uniform agglomerates in which the low-iron fragments are tightly bonded by a network of compressed high-iron, clay-like micropellets. In other words, one fraction of the ore is comminuted to a size which will permit briquetting in the presence of an added binder, and the other fraction of the ore is used as that binder.

The briquettes, which are substantially physically and chemically uniform and have high physical strength and resistance to decrepitation when heated, are in a form ideally suited to treatment with a flow of hot gases in a shaft furnace to effect drying and preheating without disintegration or decrepitation and a uniform, controlled degree of reduction. Accordingly, the green briquettes are fed to the top of a column of briquettes moving downwardly against a counterflow of hot gases. The column comprises three superposed zones, an upper drying zone, a middle preheating zone, and a lower reduction zone. Hot gases, obtained by the partial combustion of a hydrocarbon fuel and containing CO, $H_2$ and, when desired, controlled concentrations of sulphur and supplied to the briquettes in the reduction zone, are caused to rise therethrough to reduce metals from the group comprising nickel and iron contained in the briquettes and to form spent reduction gas. A free oxygen bearing gas is introduced into the column at the top of the reduction zone, and the spent reduction gas is permitted to mix and combust therewith while rising through and in contact with the briquettes comprising the preheating zone of the column, to form reacted gas. The reacted gas rises through the drying zone of the column, evaporating the free moisture of the green briquettes and carrying it out of the top of the shaft furnace. Because of the physical uniformtiy of briquettes prepared according to the principles of the present invention the column of briquettes presents a uniform system of voids in which the gases can react with the briquettes and with each other in a uniform way. The reduced briquettes are recovered while hot from the shaft and transferred to an electric arc furnace where they are melted with formation of a substantially nickel-barren slag and a bath of either high purity ferronickel or in an alternative modification, ferronickel matte underlying the slag, which is tapped therefrom by known methods.

An object of the present invention is to treat run-of-mine ore from the above highly variable type of occurrence to provide beneficiated ore having minimum variability in physical and chemical properties, and to recover directly therefrom either ferronickel without the need for refining, or alternatively, ferronickel matte.

A further object is to beneficiate the ore without first drying it to the point that serious dusting occurs in subsequent handling steps.

Another object of the invention is to prepare mixtures of fine and coarse fractions of the ore in such a way as to avoid segregation of the fractions in handling and storage.

A still further object is to form from the mixtures, briquettes which have sufficient strength to resist breakage when fed to and treated in a shaft furnace for the reduction of their contained nickel at elevated temperature, and thereby to provide a bed of briquettes of uniform permeability for controlled gas-solid reaction.

Other objects and advantages of the invention will be apparent from the following description taken in conjunction with the accompanying drawing.

DESCRIPTION OF THE PREFERRED EMBODIMENTS

Figure 2:
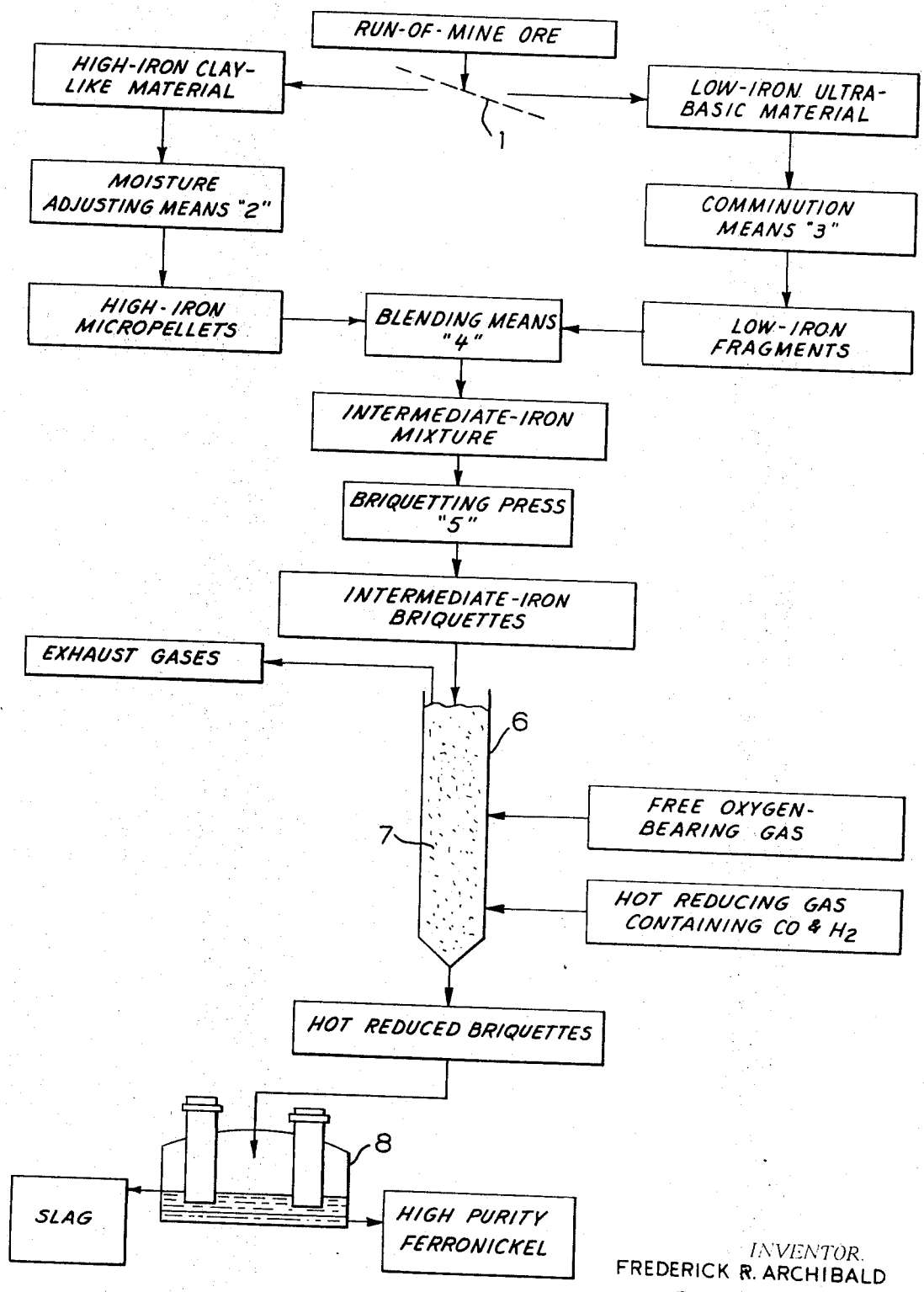
FIG. 2 is a schematic representation of an embodiment of the present invention.

FIG. 2 schematically depicts an embodiment of the present invention. Run-of-mine ore is divided by separating means 1 into a coarse fraction comprising low-iron ultrabasic material and a fine fraction of high-iron clay-like material. The fine fraction is treated by moisture adjusting means 2 to produce agglomerates less than about ¼" in size that are referred to herein as micropellets. The ultrabasic material is treated by comminution means 3 to produce low-iron fragments that are less than about 1" in size and generally about ¼" in size or less. The high-iron micropellets and low-iron fragments are mixed in blending means 4 to produce an intermediate-iron mixture that is briquetted in briquetting press 5 to produce homogeneous, high-strength briquettes. The briquettes are fed to shaft furnace 6 onto downwardly moving column 7 where they are dried, preheated and reduced with a counter-current flow of hot gases. Hot reduction gases containing carbon monoxide, hydrogen and, when desired, controlled concentrations of sulphur are fed into the lower part of the column and spent reduction gases are combusted by means of free oxygen-bearing gas added above the reduction zone. Hot reduced briquettes are removed from the furnace 6 and are fed into and melted in electric arc furnace 8 to form slag and either high purity ferronickel or ferronickel matte depending on the sulphur concentration of the hot reduction gases.

Figure 1:
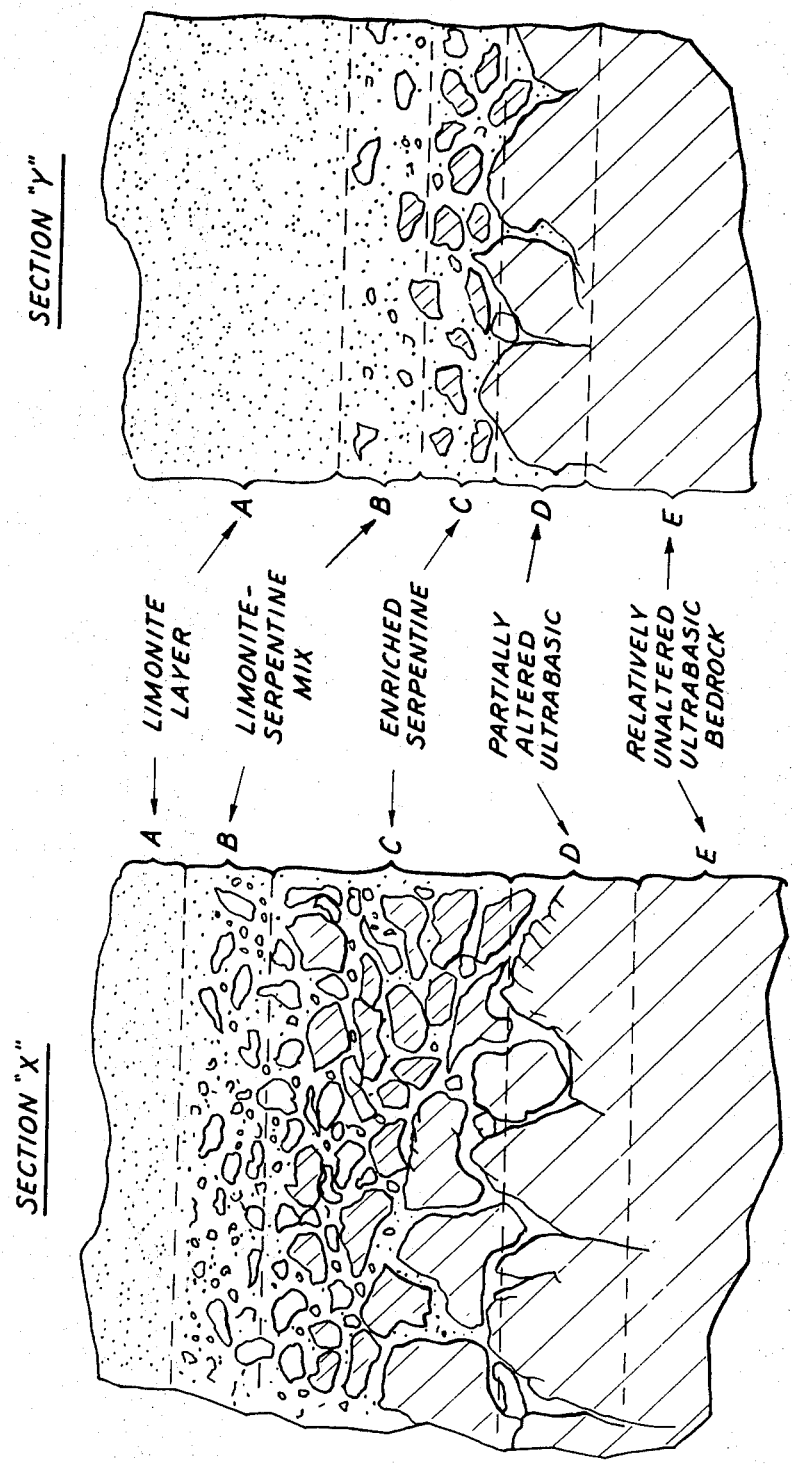
FIG. 1, as noted, earlier, illustrates diagrammatically the type of oxidized nickel occurrence with which the present invention is concerned.
Figure 3:
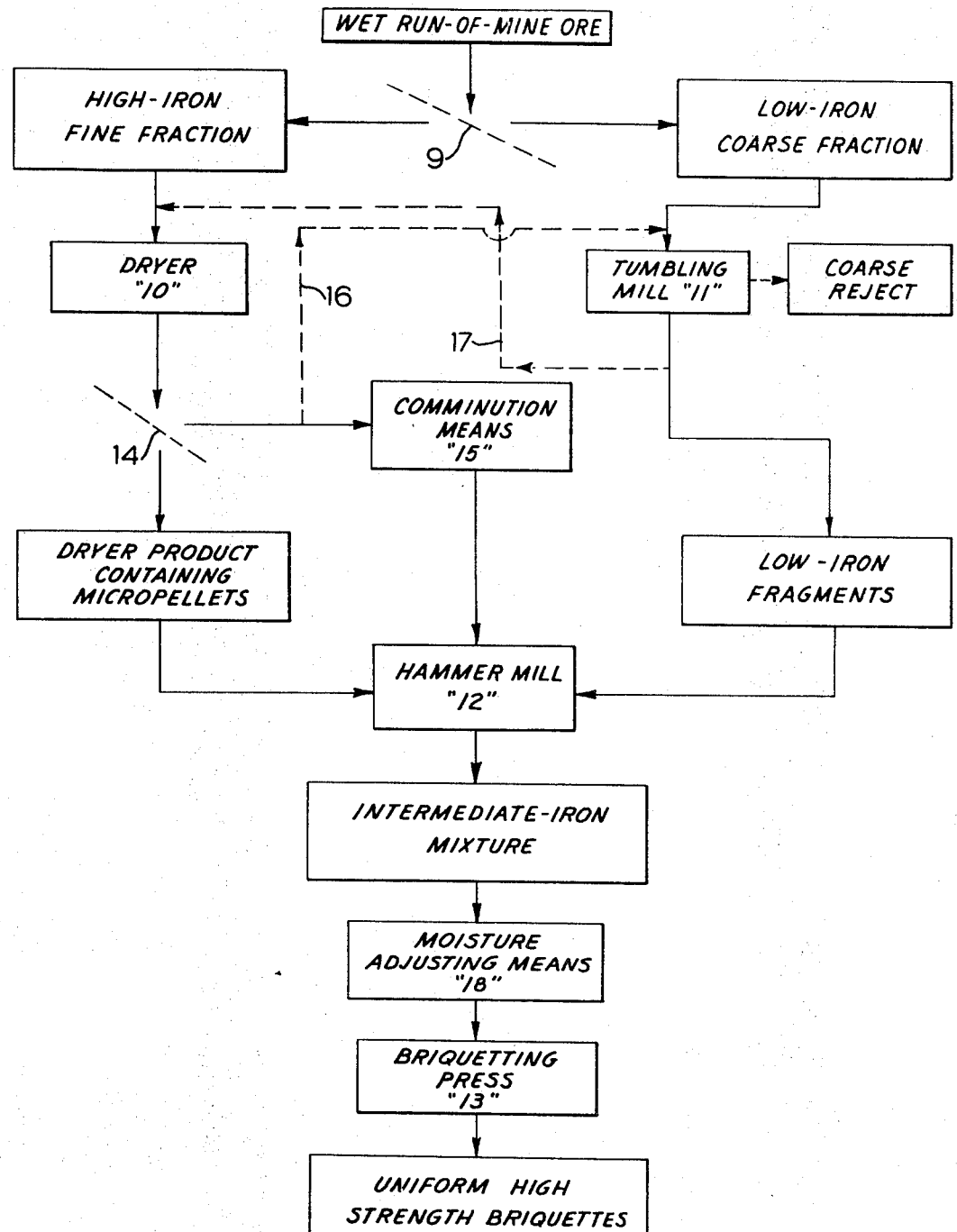
FIG. 3 is another schematic representation of an embodiment of a part of the process of the invention showing several variations that are within the scope of the invention.

FIG. 3 schematically depicts the application of the invention in treating wet ore of the type shown in FIG. 1. Such run-of-mine ore, containing clods of high-iron, clay-like material, is fed to a coarse screen or grizzly 9 with, for example, 4-inch openings, that serves as the separating means. The clay-like clods are passed through the screen as undersize, separate from oversize ultrabasic boulders and joint blocks that constitute the low-iron coarse fraction. The high-iron fine fraction of the ore, containing the clods and any −4-inch ultrabasic fragments as may occur, are treated in a dryer 10, such as a fuel-fired rotary dryer, advantageously equipped with a festoon of chains to prevent sticking, that serves as the moisture-adjusting means. The fine fraction is partially dried therein and the moisture content adjusted from the range of about 25–35% moisture to the range of about 15–20%, thereby comminuting clods and forming small agglomerates, herein termed micropellets that are about ¼ inch in size or less and assay, for example, 20–25% Fe. The low-iron coarse fraction is treated in a tumbling mill 11 equipped with peripheral discharge openings according to the design and operation described in the copending application referred to above. The tumbling mill serves as the comminution means to produce ultrabasic fragments less than about 1" in size and generally about ¼" in size or less that assay, for example, 8–10% Fe. The high-iron dryer product containing the clay-like micropellets and the low-iron tumbling mill product of ultrabasic fragments are fed to an impact mill such as a hammer mill 12 that serves as the blending means not only to blend the two products intimately but also further to comminute clods and ultrabasic fragments in the products to produce a homogeneous intermediate-iron mixture in which all fragments and agglomerates are less than about 1" and generally less than about ¼" in size. The intermediate-iron mixture is then fed to and briquetted in briquetting press 13. The briquettes are formed under pressure in the roll pockets without added binders, the intensively mixed clay-like micropellets serving as a natural binder forming a strong network bonding the low-iron fragments together in each briquette. The briquettes are then fed to a shaft furnace as described with reference to FIG. 2. Within the scope of the invention are certain refinements and variations of the foregoing embodiments such as those described following:

(1) Such −4-inch ultrabasic fragments as occur in the product from the dryer 10 can be separated from the micropellets, such as on a 1" screen 14, with the +1" fragments being comminuted separated in comminution means 15 before rejoining the micropellets in the blending means (hammer mill 12).

(2) Alternatively such −4+1-inch fragments separated on the screen 14 can be added to the low-iron fraction of the ore that is treated in the tumbling mill, as shown by broken line 16, thereby becoming ultimately part of the low-iron product.

(3) Tumbling mill product can be blended with the fine-sized high-iron constituents of the ore at any stage after the original division of the run-of-mine ore and before briquetting of the intermediate-iron mixture, e.g., before the high-iron constituents are added to the dryer 10 as shown by broken line 17.

(4) The tumbling mill 11 can be operated either to produce a low grade reject coarse fraction, as shown by the broken line in FIG. 3 and as described in the copending application referred to above, thus producing an upgraded product of low-iron fragments, or simply to comminute the boulders to produce a low-iron product of serpentinic and ultrabasic fragments and no reject fraction.

(5) The intermediate-iron mixture can be fed to a moisture adjusting means or conditioning drum 18, such as for addition of moisture immediately prior to briquetting as an additional control over the moisture content of the treated ore.

(6) It is advantageous to stockpile the high-iron and low-iron fractions of the ore separately in case localized zones of either low-iron or high-iron ore, represented characteristically by sections "X" and "Y", respectively, in FIG. 1 are encountered in the orebody. The surge capacity of the stockpiled storage zones permits the maintenance of flows of the high- and low-iron fractions of the ore substantially proportional to the ratio of occurrence of these fractions in the orebody as a whole and results in an intermediate iron mixture with a composition which is relatively invariant. Even more importantly such proportional flow ensures that at all times sufficient clay-like binder is present in the briquetting press feed to result in briquettes having the necessary green and dry strengths for treatment in the shaft furnace. Alternatively, only the high-iron fraction may be accumulated in a stockpile or storage zone with material being withdrawn therefrom for treatment at a uniform rate relative to the rate of low-iron constituents treated therewith.

A simplification of the above stockpiling scheme is to stockpile the low-iron fragments together with the high-iron fraction of the ore in two or more composite stockpiles or storage zones that are alternately being added to and withdrawn from in turn. Such a scheme could apply, for example, in the flow arrangement depicted in FIG. 3 by the dotted line 17 joining the tumbling mill product with the dryer feed.

But it is emphasized that none of these refinements or variations is limiting to the scope of the invention. In the preparation of briquettes according to this invention it is necessary only that the mined ore be divided into a fine and a coarse fraction, that the moisture content of the fine fraction be adjusted to produce high-iron clay-like micropellets, that the coarse fraction be comminuted to produce low-iron ultrabasic fragments and that a blend of the micropellets and fragments be produced as an intermediate-iron mixture for briquetting. As previously set forth the blend of micropellets and fragments can result from addition of the fragments to the high-iron constituents of the ore at any stage before, during or after formation of the micropellets.

To illustrate further the broad application of the present invention consider, for example, the treatment of a dry ore of the type shown in FIG. 1 which could readily occur in any location during periods of little rainfall.

In such run-of-mine ore much of the high-iron material is not coalesced as muddy clods but on the contrary is relatively free-flowing and dusty. In such cases the moisture content of the fine fraction of the ore must be adjusted upwardly by the addition of moisture thereto in a wetting drum, for example, in order that micropellets can be generated and the mixture thereof with the low-iron fragments be satisfactorily briquetted.

Figure 4:
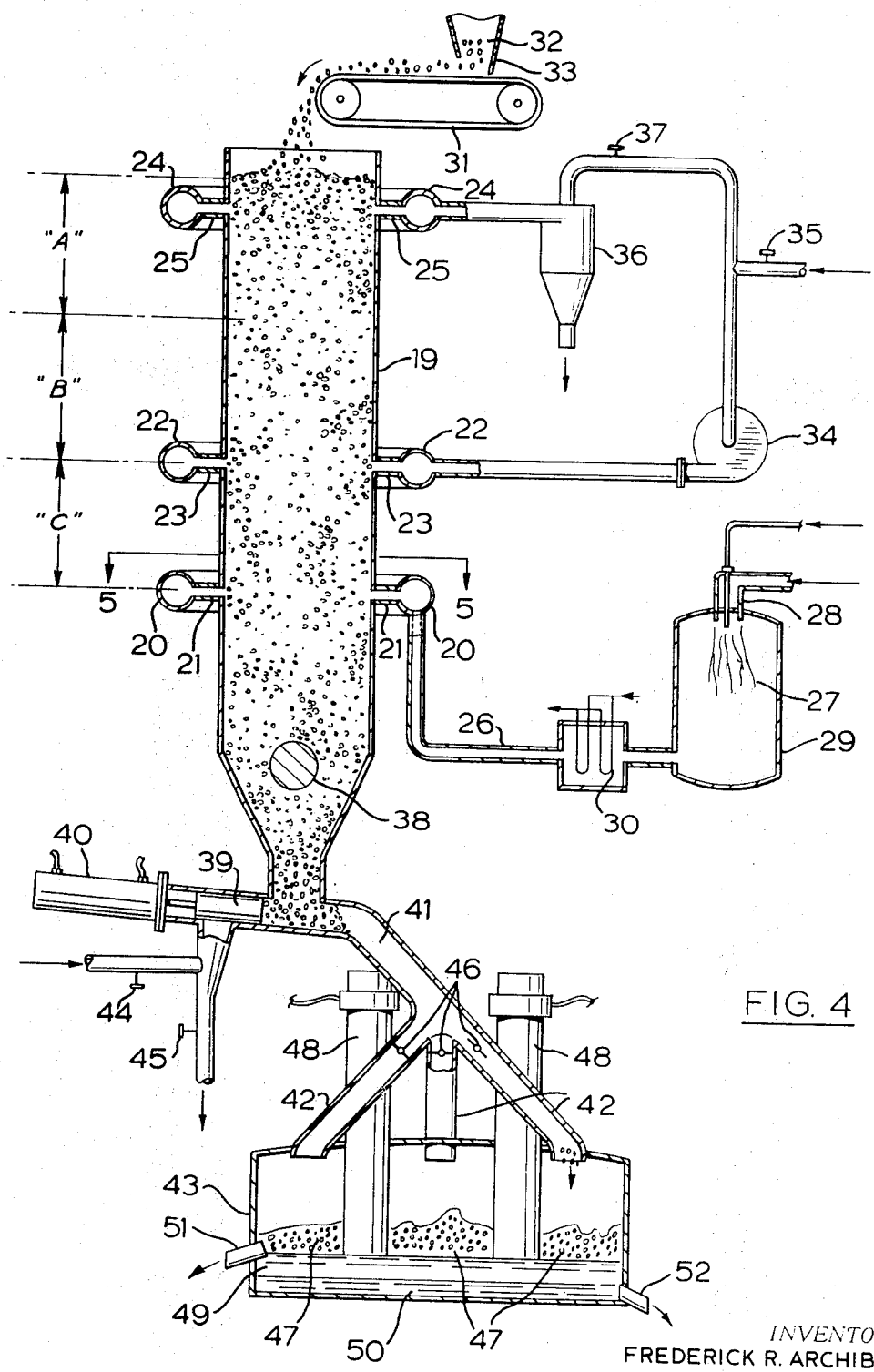
FIG. 4 illustrates diagrammatically a preferred means of reducing briquettes and melting them to form high purity ferronickel and discardable slag in the process of the invention.
Figure 5:
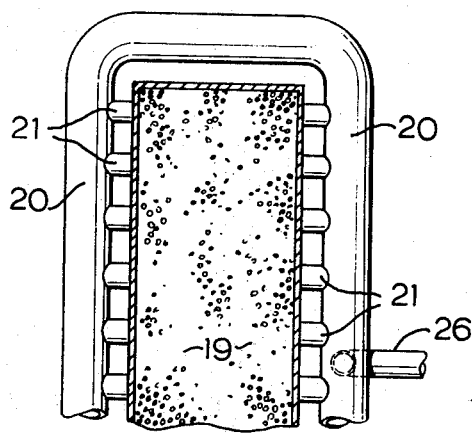
FIG. 5 is a plan view in section through line 5—5 of FIG. 4.

As described in conjunction with FIG. 1 the high strength briquettes are reduced in a shaft furnace and FIG. 4 shows diagrammatically in vertical section a shaft furnace 19 equipped with bustle pipes 20, 22, 24 and tuyeres or openings 21, 23, 25, in which the reduction operation may be carried out. FIG. 5 is a sectional plan view, through line 5—5 of FIG. 4, of the bustle pipe 20 and the tuyeres 21. Hot reducing gases are fed into the shaft furnace 19 via conduit 26, the bustle pipe 20 and the tuyeres 21. Reduction gases 27 are prepared by the partial combustion of a hydrocarbon fuel with air at temperatures ranging from 1200 to 1450° C. via burner 28 feeding into combustion chamber 29, and the temperature of the gases 27 may be lowered by water cooling coils 30. As aforementioned, the reduction gases may, if desired, contain controlled concentrations of sulfur.

The shaft furnace 19 is fed by conveyor 31 with green briquettes 32 from hopper 33, at a rate sufficient to maintain a stockline substantially as shown. Hot reducing gases entering tuyeres 21, for example at 950 to about 1150° C., are dispersed by and around the briquettes, rising through them to create zone "C," the reduction zone, where contained metals selected from the group nickel and iron are reduced. Blower 34 draws air past valve 35, which controls air flow, into the bustle pipe 22 and into the shaft furnace 19 via the tuyeres 23 to support combustion of the spent reduction gases within the briquettes comprising zone "B," immediately above the zone "C." The top gas offtake openings 25 and the bustle pipe 24 are provided as shown, to permit dilution of the air with an oxygen-poor gas in case the heat generated in the zone "B" becomes too intense. In this case the top exhaust gas is passed through dust remover 36 and controlled by valve 37. Hot gases formed by combustion of spent reduction gas with air in the zone "B" rise through the briquettes in the zone "A," evaporating the contained moisture and this moisture is carried out the top of the shaft with the hot gases. Temperatures in the column are controlled by suitably varying the gas flows.

The bottom part of the shaft is equipped with support member 38 to relieve pressure of the charge in the lower part which is constricted to facilitate withdrawal of reduced briquettes by pusher 39 controllably activated by compressed air cylinder 40 to discharge reduced briquettes via conduits 41 and 42 into electric arc furnace 43. Flush water valve 44 and drain valve 45 are periodically opened to wash away any dust accumulating below the pusher. The conduits 42 are equipped with valves 46 to control the placement of reduced briquettes 47 to optimum advantage around electrodes 48 for maximum smelting efficiency. An additional number of the conduits 42 (not shown) permit complete distribution around the electrodes 48. Heat generated at the lower portions of the electrodes 48 melts the reduced briquettes 47 to form a slag layer 49 and a ferronickel bath 50 or, alternatively, ferronickel matte depending on the sulphur concentration of the hot reducing gases. The slag 49 is skimmed via tap-hole 51, and the ferronickel 50 or, alternatively, ferronickel matte is tapped at 52.

Figure 7:
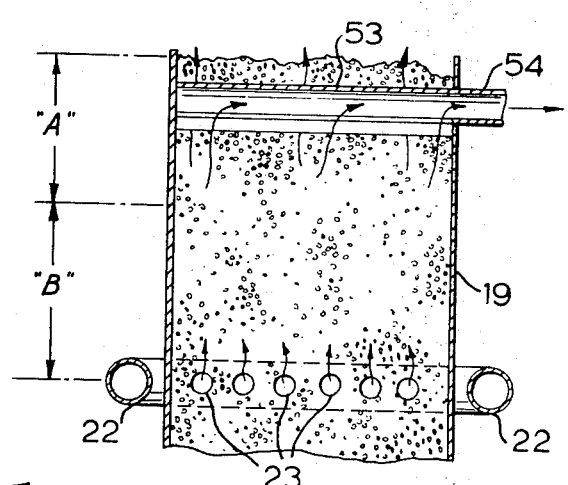
FIG. 7 is a vertical, sectional view taken along line 7—7 of FIG. 6.
Figure 6:
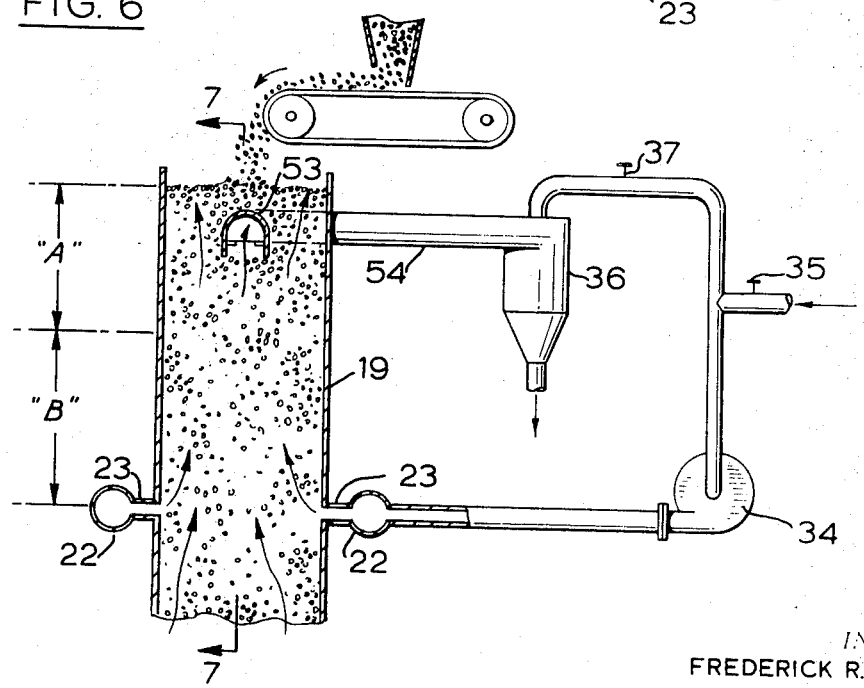
FIG. 6 shows diagrammatically in vertical section a modification in the upper sections of the shaft furnace shown in FIG. 4.

It can happen in certain circumstances that the spent reduction gases are incompletely combusted in the zone "B," and, therefore, contain residual fuel values. In such cases it has been found that in lieu of withdrawing gas through the top gas off-take openings 25 as shown on the sides of the shaft in FIG. 4, the incompletely combusted part of the gas is preferentially withdrawn as shown in FIGS. 6 and 7, (FIG. 7 being a vertical sectional view through line 7—7 of FIG. 6) through a centre gas off-take 53 that is disposed along the horizontal centre line of the shaft parallel to the sides containing the tuyeres 23 and 21 (shown in FIG. 3). Such fuel bearing gases are drawn from the centre gas off-take 53 through conduit 54 and into the dust remover 36 where they are cleaned. The cleaned gases are mixed with air via the valve 35 and the resulting mixture is fed into the shaft furnace 19 via the bustle pipe 22 and tuyeres 23 into the zone "B" where combustion is completed. The arrangement shown in FIGS. 6 and 7 thus serves not only to dilute the oxygen bearing gas to prevent overheating in the zone "B," but also to recover unburnt fuel values which might otherwise be lost.

The segregating function of the centre gas off-take 53 is possible because of the effect that the uniform briquettes have on the movement of gases through the shaft. Unlike a vertical lime kiln containing a charge of non-uniform chunks of limestone through which uneven flow and distribution of gases occurs thereby requiring as many as three gas-withdrawal manifolds spaced evenly across the upper section of the shaft, the present shaft contains a column of uniform briquettes through which gases move freely and evenly, thereby permitting the preferential withdrawal of a particular fraction of the gas through one manifold in the middle of the section.

To illustrate both the effect of the centre gas off-take 53 in segregating shaft gases and the effect that the external mixing of the withdrawn gases with air has on the subsequent combustion of the mixture in the shaft, the relevant dry gas analyses set forth in Table II below are typical.

TABLE II

|  | CO | $CO_2$ | $H_2$ | $N_2$ | $O_2$ |
|---|---|---|---|---|---|
| Centre gas | 7.5 | 11.1 | 11.0 | 70.4 |  |
| Gas-air mixture | 4.0 | 5.7 | 5.7 | 74.5 | 10.1 |
| Waste gas | 1.8 | 15.2 | 2.9 | 79.6 | 0.5 |

The mixture of air with the centre gas is reflected in the composition of the gas-air mixture by the lower concentrations of all species except $N_2$ and $O_2$, while the combustion of the gas-air mixture in the shaft is indicated by the low concentrations of CO, $H_2$ and $O_2$ and the high concentration of $CO_2$ in the waste gas relative to those of the gas-air mixture. Thus means are provided according to this invention whereby gases containing calorific values are segregated from waste gases within the shaft and withdrawn therefrom mixed with air outside the shaft, and returned thereto and reacted to recover usable heat.

The advantages of the invention are further illustrated by the following examples.

EXAMPLE 1

2000 lb. of ore consisting of clay-like clods of high-iron material similar to types A and B, as reported in Table I, were intermixed, in irregular porportions, with ultrabasic fragments and boulders similar to types C and D, also reported in Table I. Although because of the lack of homogeneity of the ore it was not possible to obtain a representative sample of the 2000-lb. lot, the free moisture content was estimated at about 27%.

The ore was fed to a vibrating grizzly having 4″ openings through which the clods of high-iron material and ultrabasic fragments were passed and separated as undersize from the +4″ boulders. The so-separated clods and fragments were stockpiled and from the stockpile were fed continuously to an oil-fired rotary dryer equipped with lifters and a festoon of chains to effect partial drying and separation of the ultrabasic fragments from the high-iron clods. The dryer product was discharged continuously and found to consist of −1″ clods, micropellets of clay-like material containing about 20% by weight free moisture, and discrete ultrabasic fragments largely greater than 1″ in size. The +1″ ultrabasic fragments were separated from the remainder of the dryer product by screening on a trommel having 1" openings and were diverted with the +4" boulders to a low-iron stockpile.

The low-iron stockpile material was continuously fed into a tumbling mill wherein substantially all of this material was reduced to $-\frac{1}{4}''$ ultrabasic fragments. The ultrabasic fragments were continuously fed, together with the clods and micropellets from the dryer, into the boot of a bucket elevator discharging into a hammer mill. In the hammer mill the clods were broken down even further into micropellets and the whole mass of micropellets and ultrabasic fragments subjected to intensive intermixing to form intermediate-iron mixture, which was fed into a conditioning drum for small moisture additions, when necessary for the preparation of briquette feed. All of the above products were weighed, sampled and analyzed, to permit computation of the overall materials balance summarized in Table III.

CO, 0.6; $CO_2$, 14.2; $H_2$, 0.4; $N_2$, 82.4; $O_2$, 2.3.

Treated briquettes were discharged from the bottom of the shaft at approximately 900° C. and transferred, without further cooling or access to air, to an electric arc furnace. Melting of the briquettes in the arc furnace was quietly and smoothly effected at 1500–1600° C. with the consumption of only 380 kw.-hr. per dry ton of green briquettes and with the production of negligible quantities of fume or dust. Ferronickel and slag were tapped from the electric furnace and found to analyze as follows in weight percent:

Ferronickel analysis

Ni, 47.6; Co, 1.0; Fe, 51.0; Si, <.01; Cr, 0.007; Mn, 0.0007; P, 0.01; S, 0.045; C, 0.007.

Slag analysis

Ni, 0.20; FeO, 23.5; $SiO_2$, 41.2; MgO, 30.2.

TABLE III.—MATERIAL BALANCES SUMMARIZING PREPARATION OF BLENDED INTERMEDIATE-IRON FEED FROM RUN-OF-MINE OXIDIZED NICKEL ORE

| Product | Dry weight | | Analysis, Percent | | Percent free $H_2O$ |
|---|---|---|---|---|---|
| | Lb. | Percent | Ni | Fe | |
| (1) Separation of wet ore on grizzly: | | | | | |
| +4" Ultrabasic boulders | 700 | 35 | 1.72 | 8.4 | 12 |
| −4" dryer feed | 1,300 | 65 | 1.63 | 21.5 | 35 |
| Run-of-mine wet ore | 2,000 | 100 | 1.66 | 16.9 | 27 |
| (2) Drying and separation of dried product: | | | | | |
| −4"+1" ultrabasic fragments | 400 | 20 | 1.64 | 14.7 | 13 |
| −1" dryer product | 900 | 45 | 1.62 | 24.5 | 20 |
| Dryer feed | 1,300 | 65 | 1.63 | 21.5 | 35 |
| (3) Comminution of ultrabasic: | | | | | |
| +4" ultrabasic boulders | 700 | 35 | 1.72 | 8.4 | 12 |
| −4"+1" fragments | 400 | 20 | 1.64 | 14.7 | 13 |
| −¼" comminuted ultrabasic | 1,100 | 55 | 1.69 | 10.7 | 12.4 |
| (4) Blending of high and low iron fractions: | | | | | |
| −1" dryer product | 900 | 45 | 1.62 | 24.5 | 20 |
| −¼" comminuted ultrabasic | 1,100 | 55 | 1.69 | 10.7 | 12.4 |
| −¼" hammer-mill product | 2,000 | 100 | 1.66 | 16.9 | 15.8 |

Although the high-iron dryer product contained about 20% moisture, the simultaneous feeding therewith of ultrabasic fragments containing only 12.4% moisture into the boot of the bucket elevator was found to have prevented build-up in this apparatus and in the hammer mill.

The $-\frac{1}{4}''$ hammer-mill product, or blended intermediate-iron feed was sampled and found to analyze, in weight percent, dry basis, as follows:

Ni, 1.66; Fe, 16.9; $SiO_2$, 33.0; MgO, 24.8; $Cr_2O_3$, 0.80; Combined $H_2O$, 12.5.

The intermediate-iron feed was briquetted without further additions in a low-pressure roll-type briquetting press having 2" x 2" pockets. The resulting briquettes were found to have high green strength and were continuously treated in a shaft furnace of the type illustrated in FIG. 4, as modified by FIG. 6, and described in the relevant text. High purity naphtha fuel containing less than about 0.01% sulphur was partially combusted in combustion chamber 27 at a rate of 137 lb./dry ton briquettes, with air fed at a rate of 12,360 s.c.f./ton, to give gases which after contacting cooling coils 30 entered primary tuyeres 21 at a temperature of about 1100° C. Typical dry analysis of the hot gas was as follows:

CO, 16.5; $CO_2$, 4.7; $H_2$, 16.1; $N_2$, 62.7.

7260 s.c.f. exhaust gas and 12,060 s.c.f. air per ton briquettes were distributed into the column via secondary tuyeres 23 by blower 34 and via valves 37 and 35 respectively. The remainder of the exhaust gas was vented from the top of the column and was found to be substantially devoid of fuel value as indicated by the following analysis:

Recovery of nickel in the ferronickel was over 90%.

As the above analysis shows, the ferronickel produced in accordance with the principles of the present invention was substantially devoid of contamination by silicon, chromium, manganese, phosphorus, sulphur or carbon. This result represents a marked improvement over prior methods in which a refining step is necessary for removal of these contaminants to an acceptably low level. In other words, the present ferronickel is a novel product, having a degree of purity in the unrefined state not attainable by prior art methods.

In certain cases for any of a variety of reasons it might be preferred, however, to produce ferronickel matte rather than high purity ferronickel and the present process is eminently suited for either purpose. Accordingly, the sulphur concentration of the ferronickel is a direct function of the sulphur present in the reduction zone of the shaft, which, according to the most convenient practice of the invention, means the sulphur concentration of the fuel combusted for generation of the hot reduction gases. Thus, if a naphtha fuel substantially devoid of sulphur is used, the resulting product is high purity ferronickel, as in Example 1. If, on the other hand, relatively unrefined high-sulphur fuels are used such as Bunker C fuel oils, which can contain as much as 7% sulphur or so, the sulphur concentration of the resulting product is substantial and it is more properly referred to, therefore, as ferronickel matte. The sulphur concentration of the matte can be increased by providing additional sulphur to the reduction zone of the shaft by any of a number of convenient means, such as mixing raw sulphur with the fuel or injecting it into the reducing gases, or supplying sulphur-bearing gases such as hydrogen sulphide and sulphur dioxide to the reduction zone together with or independently of the reducing gases.

In any event, it has been found that under the conditions existing in the shaft furnace, between about 35 and 70% or so of the sulphur entering the reduction zone is retained and reports in the resulting ferronickel. An illustration of the effect of using high sulphur fuels is provided by reference to the following example.

EXAMPLE 2

For convenience the data relate to the treatment of ore at an hourly rate of one dry short ton of briquettes containing 1.73% Ni. The briquettes were treated with reducing gas generated by the partial combustion of Bunker C fuel oil containing 2.5% sulphur at a rate of 190 lb./hr. Upon melting of the reduced briquettes about 90% of the nickel was recovered as ferronickel containing 51.9% Ni and 4.4% S. Using these data calculation shows that about 55% of the sulphur in the fuel reported in the ferronickel.

The nickel and sulphur concentrations of the ferronickel can, however, be varied and controlled more or less at will. The more iron that is reduced in the shaft furnace the lower is the resulting nickel grade, and the higher the sulphur content of the fuel the higher the sulphur tenor of the matte. Thus, if one dry short ton of briquettes containing 1.70% Ni were treated with the gas resulting from the partial combustion of 190 lb. of Bunker C fuel oil containing 6% S, and 90% of the nickel and 60% of the sulphur were recovered in a ferronickel matte containing 40% Ni, the sulphur tenor of the matte would be about 9%. Similarly, if the fuel contained 7% S and 70% of the sulphur were recovered together with 90% of the nickel in a matte containing 35% Ni, the sulphur tenor of the matte would be nearly 11%. Experience will indicate the conditions required to achieve the desired matte composition. It is to be understood that the word matte, at least as far as this specification is concerned, refers to ferronickel containing about 3% sulphur or more.

EXAMPLE 3

To demonstrate the existence of high-iron micropellets in disintegrated partially dried oxidized nickel ores of the type to which the present invention is applicable, a quantity of ore was passed through a 4" vibrating screen for removal of low-iron boulders, and partially dried to about 20% $H_2O$, wet basis. The partially dried product was further sized on a screen having 1" openings, for removal therefrom of +1" low-iron fragments released by the drying operation. The undersize was then passed through a hammer mill to form micropellets therefrom, and the so disintegrated product was divided into two equal portions. The first portion was subjected to screen analysis at 100 mesh at the same moisture content as that at which it was produced, i.e., about 20% $H_2O$, wet basis. The second portion was wet screened by washing with water. Weighing and chemical analysis of the products gave the following results:

| Tyler mesh | Dry screen analysis | | Wet screen analysis | |
|---|---|---|---|---|
| | Wt. percent | Percent Fe | Wt. percent | Percent Fe |
| +100 | 81.1 | 19.2 | 39.1 | 11.6 |
| −100 | 18.9 | 19.4 | 60.9 | 24.3 |
| | 100.0 | | 100.0 | |

Wet screening can be seen from the above figures to have destroyed the high-iron micropellets fraction of the dryer product and to have washed it through the 100-mesh screen, reducing the iron analysis of the +100-mesh fraction from 19.2% to 11.6% Fe. Destruction of the micropellets by wet screening can also be seen to have separated a substantially homogeneous material with respect to iron into a low-iron coarse fraction and a high-iron fine fraction. It will be evident to those skilled in the art, on the other hand, that excessive drying of the high-iron fine fraction, for example to bone dryness, could result in a similar destruction of the micropellets, and consequently in similar loss in homogeneity of the product.

The grade of the ferronickel or, alternatively, of the ferronickel matte depends upon the nickel and iron concentrations of the briquettes, i.e., on the Ni/Fe ratio thereof, and on the degree of reduction effected by the gas introduced into reduction zone "C." The degree of reduction, in turn, depends on the reduction ratio of this gas, i.e., the ratio of $CO+H_2$ to $CO_2+H_2O$, on the quantity of this gas, on its time of contact with the briquettes, and on the temperature at which reduction takes place. Thus, since the spent reduction gas must contain sensible heat and fuel values which when combusted with the secondary air in zone "B" is sufficient to dry and preheat the briquettes but insufficient to result in fusion thereof, it will be apparent to those skilled in the art that close qualitative and quantitative control of all flows must be exercised in order to produce uniformly reduced briquettes for transfer into the electric furnace.

Important as it is that the overall flows of briquettes and gases be closely matched, it is even more important that the column of briquettes maintain a substantially uniform permeability to the flow of gases in all three treatment zones in order to avoid channelling and localized overheating. Preparation of feed comprising low-iron fragments bonded by intermixed high-iron micropellets according to the principles of the present invention ensures the production of briquettes having high green strength, resistance to degradation in the drying and preheat zones "A" and "B", and high fired strength for treatment in the reduction zone "C". Because each briquette consists of relatively refractory low iron, high-magnesia fragments bonded by a network of more easily fusible high-iron low-magnesia material, it is resistant to deformation or degradation and thus retains its dimensions through the treatment. Moreover, the continuous contiguity of the high-iron and low-iron constituents of the ore in each briquette ensures that iron oxide in the high-iron fraction, when reduced to FeO, can react in the solid state with the ultrabasic fragments and be absorbed thereby. Slagging reactions can therefore occur by solid state diffusion processes before the briquettes enter the melting furnace. Thus, the heat treatment and controlled reduction of briquettes in the shaft relieves the melting furnace not only of reduction duty, but also of a large proportion of the slag-making duty, both of which are seen to contribute to the contamination of the product with impurities such as silicon, chromium, and carbon when prior art smelting methods are employed. Furthermore, because slagging reactions can occur, temperatures can be maintained in zone B that are higher than the melting points of relatively low-melting impure iron silicates, formed by reaction of FeO, $Al_2O_3$, MnO and other constituents of the high-iron material with free silica in the briquettes, because the impure iron silicates can be absorbed by the relatively high-melting ultrabasic fragments thereby preventing sticking of briquettes to one another or to the walls of the shaft furnace that might otherwise occur.

When ultrabasic rock fragments and boulders are treated in the shaft furnace they shatter due to internal stresses thereby creating intolerable concentrations of fines. No such problem exists with briquettes made according to the present invention even when they contain ultrabasic fragments as large as 1" in size because the fragments are stress-relieved by deformation and cracking sustained during briquetting. Thus means are provided whereby ultrabasic fragments can be treated in the shaft furnace without decrepitation that could not be tolerated if they were fed directly thereto in unbriquetted form.

In conclusion the central features of the present development are emphasized. Thus ore of widely varying chemical and physical properties is advantageously formed into briquettes that are uniform in shape, size and overall composition and ensure fixed contact between ore particles of different mineralogical species, such as limonite and serpentine, thereby permitting subsequent reaction between these particles advantageously in the solid state under suitable conditions of temperature and atmosphere. The briquettes are heated in a shaft furnace of special design and operation without the decrepitation and resulting dust formation that is characteristic of the treatment of raw ore and without the dust problem associated with the treatment of loose ore in multiple hearth furnaces and rotary kilns. The briquettes are selectively reduced under such finely controlled conditions of temperature and atmosphere that only oxides of the group consisting of nickel and iron are reduced while oxides of more stable oxides such as those of chromium and silicon remain unreduced. Fuel consumption is minimal not only because the reduction is so highly selective but also because the shaft furnace is operated in a highly advantageous manner to extract and utilize substantially all the calorific value from the fuel fed into it. The selectively reduced briquettes are melted and because of the close proximity existing among reacting species in this agglomerated material chemical reactions that have not already been completed in the shaft furnace are quickly effected during melting to produce a discardable slag and either a ferronickel of predetermined nickel grade and of such purity that no refining is necessary to render the product suitable for market, or by use of a high sulphur fuel and the like, a ferronickel matte. The process as a whole is designed to treat nickeliferous ores of the oxide and silicate type in new ways that take advantage of the peculiar properties of the ore and produce highly desirable results in both metallurgical and economic terms.

What I claim as my invention is:

1. A process for recovering high purity ferronickel from oxidized nickel ores containing fine-sized high-iron constituents and coarse-sized low-iron constituents which comprises separating the fine-sized high-iron constituents from the coarse sized constituents, comminuting the coarse-sized constituents to form low-iron fragments, adjusting the moisture content of the fine-sized constituents and forming micropellets therefrom, forming a blend of the low-iron fragments and micropellets by addition of the fragments to the high-iron constituents at any stage before, during or after the forming of the micropellets thereby forming an intermediate iron mixture, forming uniformly sized briquettes from the intermediate iron mixture, feeding the briquettes to the top of a column of downwardly moving briquettes, the column having uniform distribution of voids for mixing and passage of gases therethrough and comprising three superposed heat treatment zones, an upper drying zone, a middle preheating zone, and a lower reduction zone, providing a hot reducing gas containing carbon monoxide and hydrogen in excess of that theoretically required for reduction of the nickel and an approximately equivalent quantity of iron, passing the reducing gases into the column at the bottom of the reduction zone and upwardly therethrough in countercurrent relationship to the descending briquettes, reducing metal of the group comprising nickel and iron in an amount equivalent to at least about twice the amount of contained nickel but leaving unreduced to metal the oxides of chromium and silicon and forming spent reduction gas, passing a free oxygen containing gas into the column at the top of the reduction zone, reacting exothermically the spent reduction gas and the oxygen in contact with the briquettes in the preheat zone thereby preheating the briquettes and forming reacted gas, passing reacted gas upwardly through the drying zone to dry the briquettes and form top gas containing the moisture of the briquettes, removing top gas from the drying zone, discharging reduced briquettes from the bottom of the column at a rate corresponding to that at which briquettes are fed to the column, melting the reduced briquettes to form a substantially barren slag and ferronickel underlying the slag and separating ferronickel from the slag.

2. A process according to claim 1 in which the high-iron and low-iron constituents of the ore are obtained in highly variable proportions, the high-iron constituents are accumulated in a storage zone and are withdrawn therefrom for treatment at a uniform rate relative to the rate of low-iron constituents treated therewith so that the composition of the resulting intermediate iron mixture is relatively invariant.

3. A process according to claim 2 in which both the high-iron and low-iron constituents of the ore are accumulated in separate storage zones and withdrawn therefrom in relatively invariant proportion.

4. A process according to claim 1 in which the micropellets formed from the fine-sized high-iron constituents are less than about ¼" in size and the low-iron fragments are less than 1 inch in size.

5. A process according to claim 1 in which the fine-sized high-iron constituents contain wet clods and the moisture adjusting means is a drying means for partial drying of the fine-sized high-iron constituents.

6. A process according to claim 1 in which the forming of the blend occurs before the forming of the micropellets.

7. A process according to claim 1 in which the forming of the blend occurs during the forming of the micropellets.

8. A process according to claim 1 in which the forming of the blend occurs after the forming of the micropellets.

9. A process according to claim 1 in which the coarse-sized low-iron constituents are comminuted in a tumbling mill to form an upgraded product of low-iron fragments and a low grade reject coarse fraction.

10. A process according to claim 1 in which the intermediate iron mixture is treated to moisture adjustment before being formed into briquettes.

11. A process according to claim 1 in which top gas is removed and mixed with free oxygen-containing gas and the mixture is passed into the column at the top of the reduction zone.

12. A process according to claim 1 in which the temperature at which the briquettes are treated is higher than the fusion temperature of the high-iron material therein.

13. A process according to claim 1 in which the column of briquettes is rectangular in horizontal cross-section, the reducing gases and free oxygen-containing gas are passed into the column through one and the same pair of parallel sides thereof, top gas is withdrawn from the drying zone along the horizontal centre-line of the column parallel to the sides through which the reducing gases and free oxygen-containing gas are passed into the column, the so-withdrawn top gas is mixed outside the column with the free oxygen-containing gas and the resulting mixed gas is passed into the column at the top of the reduction zone.

14. A process for recovering ferronickel matte from oxidized nickel ores containing fine-sized high-iron constituents and coarse-sized low-iron constituents which comprises separating the fine-sized high-iron constituents from the coarse sized constituents, comminuting the coarse-sized constituents to form low-iron fragments, adjusting the moisture content of the fine-sized constituents and forming micropellets therefrom, forming a blend of the low-iron fragments and micropellets by addition of the fragments to the high-iron constituents at any stage before, during or after the forming of the micropellets thereby forming an intermediate iron mixture, forming uniformly sized briquettes from the intermediate iron mixture, feeding the briquettes to the top of a column of downwardly moving briquettes, the column having uniform distribution of voids for mixing and passage of gases therethrough and comprising three superposed heat treatment zones, an upper drying zone, a middle preheating zone, and a lower reduction zone, providing a hot sulphur-bearing reducing gas containing carbon monoxide and hydrogen in excess of that theoretically required for reduction of the nickel and an approximately equivalent quantity of iron, passing the reducing gases into the column at the bottom of the reduction zone and upwardly therethrough in counter-current relationship to the descending briquettes, reducing metal of the group comprising nickel and iron in an amount equivalent to at least about twice the amount of contained nickel but leaving unreduced to metal the oxides of chromium and silicon and forming spent reduction gas, passing a free oxygen containing gas into the column at the top of the reduction zone, reacting exothermically the spent reduction gas and the oxygen in contact with the briquettes in the preheat zone thereby preheating the briquettes and forming reacted gas, passing reacted gas upwardly through the drying zone to dry the briquettes and form top gas containing the moisture of the briquettes, removing top gas from the drying zone, discharging reduced briquettes from the bottom of the column at a rate corresponding to that at which briquettes are fed to the column, melting the reduced briquettes to form a substantially barren slag and ferronickel matte underlying the slag and separating the mate from the slag.

15. A process according to claim 14 in which the sulphur-bearing gas is provided by partially combusting a sulphur-bearing hydrocarbon fuel.

16. A process according to claim 14 in which the sulphur-bearing gas is provided by partially combusting a hydrocarbon fuel mixed with elemental sulphur.

17. A process according to claim 14 in which the sulphur-bearing gas is provided by injecting elemental sulphur directly into the gas resulting from the partial combustion of a hydrocarbon fuel.

18. A process according to claim 14 in which the sulphur-bearing gas is provided by injecting compounds selected from the group hydrogen sulphide and sulphur dioxide into the reduction zone together with or independently of the gas resulting from the partial combustion of a hydrocarbon fuel.

References Cited

UNITED STATES PATENTS

| | | | |
|---|---|---|---|
| 2,400,461 | 5/1946 | Hills | 75—82 X |
| 3,004,846 | 10/1961 | Queneau | 75—21 |
| 3,030,201 | 4/1962 | Queneau et al. | 75—21 |
| 3,146,091 | 8/1964 | Green | 75—82 |
| 3,272,616 | 9/1966 | Queneau et al. | 75—82 X |
| 3,323,900 | 6/1967 | Takahashi et al. | 75—21 X |
| 3,388,870 | 6/1968 | Thumm et al. | 75—21 X |

HENRY W. TARRING II, Primary Examiner

U.S. Cl. X.R.

75—3, 31, 82